US010964152B2

(12) United States Patent
Jin

(10) Patent No.: US 10,964,152 B2
(45) Date of Patent: Mar. 30, 2021

(54) MOBILE SERVICE PROVIDING APPARATUS AND NON-TRANSITORY COMPUTER READABLE STORAGE MEDIUM

(71) Applicant: FUJI XEROX CO., LTD., Tokyo (JP)

(72) Inventor: Xiongfan Jin, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 320 days.

(21) Appl. No.: 15/800,650

(22) Filed: Nov. 1, 2017

(65) Prior Publication Data
US 2018/0336755 A1 Nov. 22, 2018

(30) Foreign Application Priority Data
May 16, 2017 (JP) .............................. JP2017-097208

(51) Int. Cl.
| G06Q 20/18 | (2012.01) |
|---|---|
| G07F 9/00 | (2006.01) |
| B60P 3/025 | (2006.01) |
| G06Q 30/06 | (2012.01) |
| G06K 9/00 | (2006.01) |
| G07F 13/06 | (2006.01) |
| G07F 9/10 | (2006.01) |
| G07F 13/02 | (2006.01) |

(52) U.S. Cl.
CPC ............ *G07F 9/006* (2013.01); *B60P 3/0257* (2013.01); *G06K 9/00275* (2013.01); *G06Q 30/0631* (2013.01); *G07F 9/10* (2013.01); *G07F 13/025* (2013.01); *G07F 13/065* (2013.01); *G06K 9/00288* (2013.01)

(58) Field of Classification Search
USPC .................................................. 700/245–264
See application file for complete search history.

(56) References Cited

U.S. PATENT DOCUMENTS 6,714,840 B2 * 3/2004 Sakaue .................. B25J 9/1694
                                                    318/568.1
7,187,998 B2 * 3/2007 Okamoto ................. B25J 5/007
                                                    318/568.12
(Continued)

FOREIGN PATENT DOCUMENTS

| JP | 2006-102861 A | 4/2006 |
|---|---|---|
| JP | 2014-209293 A | 11/2014 |

(Continued)

OTHER PUBLICATIONS

Maxwell et. al., "Alfred: The Robot Waiter Who Remembers You", 1999, AAAI Technical Report WS-99-15, pp. 1-10. (Year: 1999).*

(Continued)

*Primary Examiner* — Jonathan L Sample
(74) *Attorney, Agent, or Firm* — Oliff PLC

(57) ABSTRACT

A mobile service providing apparatus includes a moving unit, a specifying unit, and a recovery unit. The moving unit moves the mobile service providing apparatus. The specifying unit specifies a user to whom an article is provided. If a preset time elapses from a time when the article is provided to the user, the recovery unit recovers a portion of the provided article from the user by moving, by the moving unit, to a place where the user specified by the specifying unit is present.

16 Claims, 20 Drawing Sheets

(56) References Cited

U.S. PATENT DOCUMENTS

| | | | |
|---|---|---|---|
| 7,228,203 B2* | 6/2007 | Koselka | B25J 5/007 318/568.12 |
| 7,539,556 B2* | 5/2009 | Oohashi | G06K 9/00664 382/118 |
| 7,720,572 B2* | 5/2010 | Ziegler | G16H 20/00 700/245 |
| 8,359,122 B2* | 1/2013 | Koselka | B25J 5/007 700/245 |
| 8,639,382 B1* | 1/2014 | Clark | G06Q 10/087 700/214 |
| 8,761,933 B2* | 6/2014 | Olivier, III | G06K 9/00228 700/246 |
| 8,897,917 B2* | 11/2014 | Tanaka | G05D 1/0088 700/253 |
| 8,982,217 B1* | 3/2015 | Hickman | H04N 7/185 348/158 |
| 8,996,429 B1* | 3/2015 | Francis, Jr. | G06F 16/214 706/12 |
| 9,534,906 B2* | 1/2017 | High | G06Q 50/30 |
| 10,071,891 B2* | 9/2018 | High | G05D 1/0011 |
| 10,232,508 B2* | 3/2019 | Lafaye | B25J 9/1628 |
| 10,332,183 B1* | 6/2019 | Dogan | G06Q 10/087 |
| 10,508,010 B2* | 12/2019 | High | B60P 3/06 |
| 10,592,959 B2* | 3/2020 | Wilkinson | G06Q 90/00 |
| 2001/0037915 A1 | 11/2001 | Abekawa | |
| 2004/0230340 A1* | 11/2004 | Fukuchi | G05D 1/0234 700/245 |
| 2007/0124024 A1* | 5/2007 | Okamoto | B25J 5/007 700/245 |
| 2007/0192910 A1* | 8/2007 | Vu | B25J 19/06 700/245 |
| 2007/0284442 A1* | 12/2007 | Herskovitz | G06Q 20/18 235/383 |
| 2011/0288684 A1* | 11/2011 | Farlow | G05D 1/0038 700/264 |
| 2013/0179139 A1* | 7/2013 | Lee | A61B 5/165 703/11 |
| 2013/0184867 A1* | 7/2013 | Jang | B25J 9/1674 700/253 |
| 2014/0244429 A1* | 8/2014 | Clayton | G06Q 30/0631 705/26.7 |
| 2014/0309835 A1* | 10/2014 | Yamamoto | G05D 1/0274 701/25 |
| 2015/0193731 A1* | 7/2015 | Stevens | G06Q 10/083 705/26.7 |
| 2015/0202770 A1* | 7/2015 | Patron | G06Q 20/386 700/245 |
| 2016/0059412 A1* | 3/2016 | Oleynik | B62D 57/032 700/257 |
| 2016/0255969 A1* | 9/2016 | High | B62B 5/0026 |
| 2017/0011580 A1* | 1/2017 | Huang | G06Q 20/20 |
| 2017/0090478 A1* | 3/2017 | Blayvas | G07C 5/0808 |
| 2017/0129602 A1* | 5/2017 | Alduaiji | B60S 3/06 |
| 2017/0144306 A1* | 5/2017 | Lafaye | B25J 9/1628 |
| 2017/0173791 A1* | 6/2017 | Dalibard | B25J 9/1697 |
| 2017/0195486 A1* | 7/2017 | Li | H04M 3/5183 |
| 2017/0301173 A1* | 10/2017 | Hindsgaul | G07F 17/0014 |
| 2017/0364074 A1* | 12/2017 | Lau | G06Q 50/28 |
| 2018/0321679 A1* | 11/2018 | Nixon | G06Q 10/083 |

FOREIGN PATENT DOCUMENTS

| | | |
|---|---|---|
| JP | 2016-135625 A | 7/2016 |
| JP | 2017-509968 A | 4/2017 |
| JP | 2017-513726 A | 6/2017 |

OTHER PUBLICATIONS

D. F. Franklin, R. E. Kahn, M. J. Swain and R. J. Firby, "Happy patrons make better tippers: creating a robot waiter using Perseus and the Animate Agent architecture," Proceedings of the Second International Conference on Automatic Face and Gesture Recognition, Killington, VT, USA, 1996, pp. 253-258 (Year: 1996).*

Maxwell, B.A., Meeden, L., Addo, N.S., Brown, L.E., Dickson, P., Ng, J., Olshfski, S., Silk, E., & Wales, J. (1999). Alfred: The Robot Waiter Who Remembers You. (Year: 1999).*

Feb. 2, 2021 Office Action issued in Japanese Patent Application No. 2017-097208.

* cited by examiner

FIG.8

SERVICE PROVIDING INFORMATION EXAMPLE

| DATE | PROVIDING TIME | INPUT INFORMATION | PROVIDED ARTICLE | PROVIDING PLACE |
|---|---|---|---|---|
| 2017/3/1 | 09:35 | 123-4567 | HOT COFFEE | 001 |
| 2017/3/1 | 10:00 | 356-8821 | CAFE AU LAIT | 003 |
| 2017/3/1 | 10:21 | (face image) | WATER | VENDING MACHINE |
| 2017/3/1 | 10:53 | 789-0123 | TEA | 014 |
| 2017/3/1 | 11:00 | (face image) | ORANGE JUICE | VENDING MACHINE |

FIG.9
PERSONAL INFORMATION STORAGE EXAMPLE
| USER ID | FACE IMAGE INFORMATION | CARD INFORMATION | SEAT INFORMATION |
|---------|------------------------|------------------|------------------|
| 0001 |  | 123-4567 | 001 |
| 0002 |  | 235-0012 | 002 |
| 0003 |  | 356-8821 | 003 |

FIG. 10A
MONITORING TARGET LIST 70a
| DATE | PROVIDING TIME | USER ID | FACE IMAGE INFORMATION | PROVIDED ARTICLE | RECOVERY PLACE |
|---|---|---|---|---|---|
| 2017/3/1 | 09:35 | 0001 |  | HOT COFFEE | 001 |
| 2017/3/1 | 10:00 | 0003 |  | CAFE AU LAIT | 003 |
| 2017/3/1 | 11:00 | 0002 |  | ORANGE JUICE | 002 |
FIG. 10B
MONITORING TARGET LIST 70b
| DATE | PROVIDING TIME | USER ID | FACE IMAGE INFORMATION | PROVIDED ARTICLE | RECOVERY PLACE |
|---|---|---|---|---|---|
| 2017/3/1 | 10:21 | 0010 | 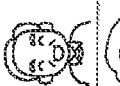 | WATER | 010 |
| 2017/3/1 | 10:53 | 0008 |  | TEA | 014 |

FIG.11

SCHEDULE INFORMATION STORAGE EXAMPLE

USER ID : 0001

| DATE | TIME | CONTENTS | PLACE |
|---|---|---|---|
| 2017/3/1 | 10:00~12:00 | MEETING | FIRST CONFERENCE ROOM |
| 2017/3/2 | 13:00~15:00 | BUSINESS TRIP | OUTSIDE COMPANY |
| 2017/3/6 | 9:00~11:00 | MEETING | THIRD CONFERENCE ROOM |

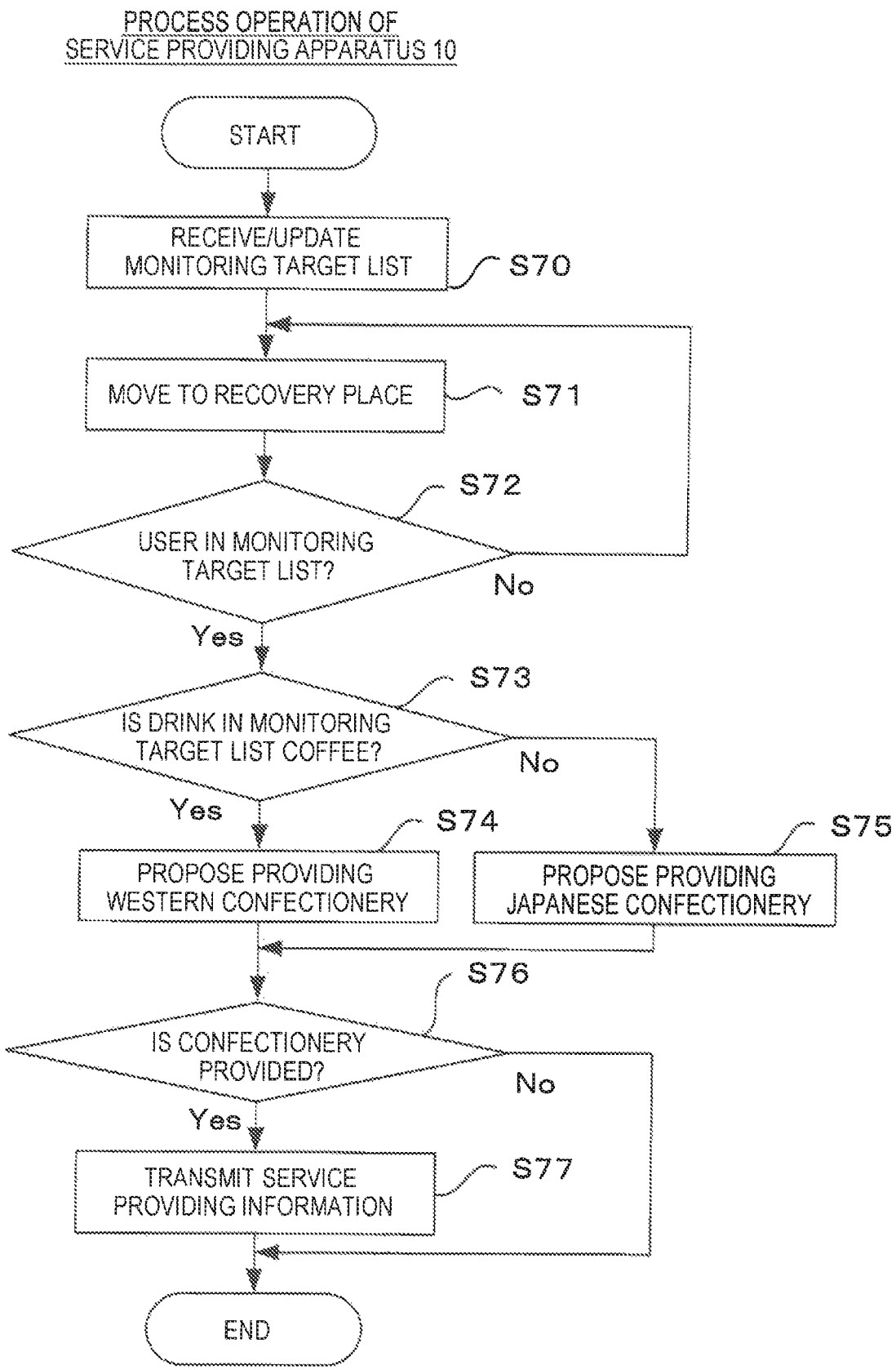

MOBILE SERVICE PROVIDING APPARATUS AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2017-097208 filed May 16, 2017.

BACKGROUND

Technical Field

The present invention relates to a mobile service providing apparatus and a non-transitory computer readable storage medium.

SUMMARY

According to an aspect of the invention, a mobile service providing apparatus includes a moving unit, a specifying unit, and a recovery unit. The moving unit moves the mobile service providing apparatus. The specifying unit specifies a user to whom an article is provided. If a preset time elapses from a time when the article is provided to the user, the recovery unit recovers a portion of the provided article from the user by moving, by the moving unit, to a place where the user specified by the specifying unit is present.

BRIEF DESCRIPTION OF THE DRAWINGS

Exemplary embodiments of the present invention will be described in detail based on the following figures, wherein:

FIG. 8 is a diagram illustrating one example of service providing information received by an information receiver;

FIG. 9 is a diagram illustrating one example of personal information stored in a personal information storage;

FIG. 10A is a diagram illustrating one example of a monitoring target list stored in a monitoring target list storage;

FIG. 10B is a diagram illustrating one example of a monitoring target list stored in the monitoring target list storage;

FIG. 11 is a diagram illustrating one example of schedule information stored in a schedule information storage;

FIG. 20 is a flowchart illustrating another operation of the service providing apparatus according to the exemplary embodiment of the present invention.

DETAILED DESCRIPTION

Figure 1:
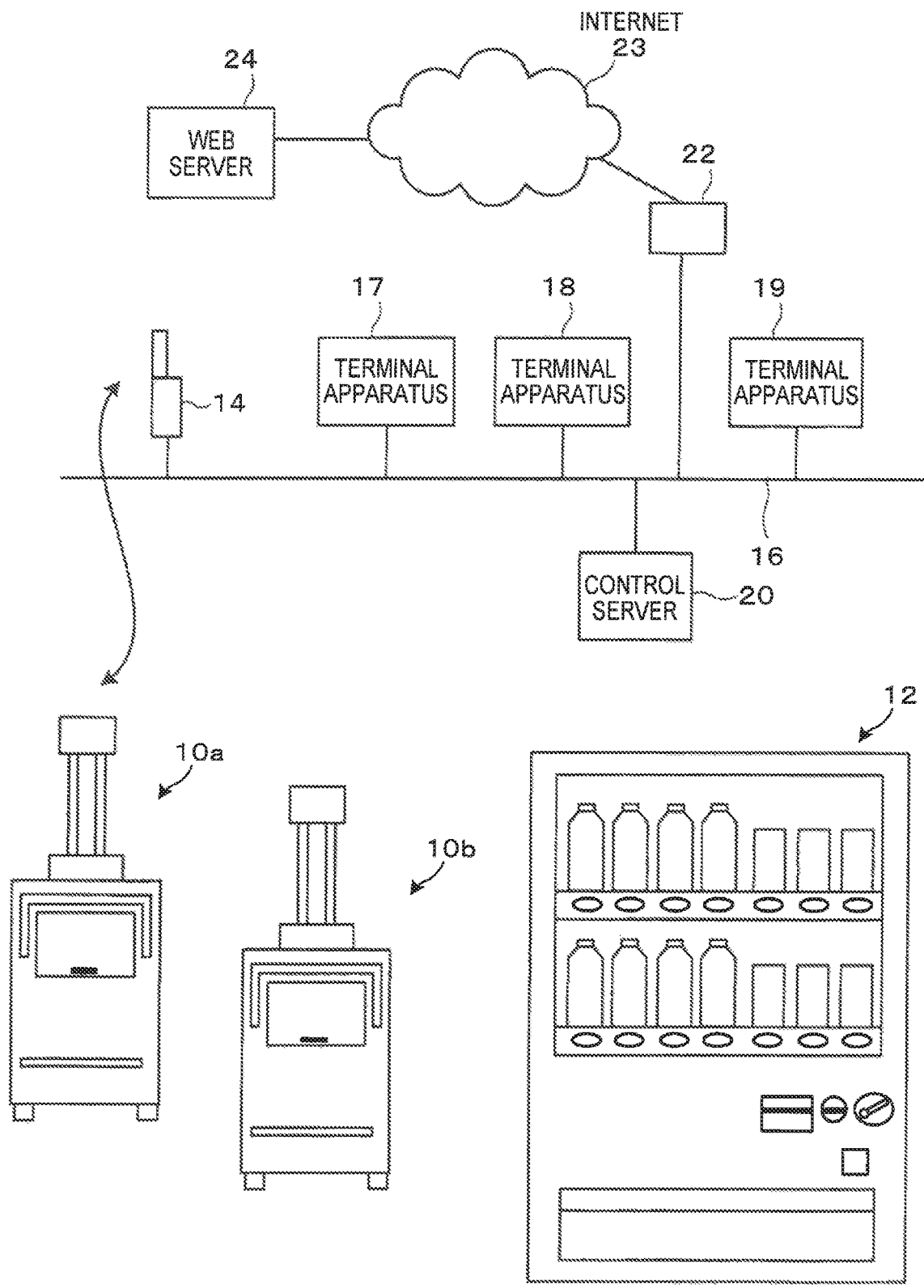
FIG. 1 is a system diagram illustrating the configuration of a service providing system according to an exemplary embodiment of the present invention.

Next, exemplary embodiments of the present invention will be des bed in detail with reference to the accompanying drawings, FIG. 1 is a system diagram illustrating a configuration of a service providing system according to an exemplary embodiment of the present invention.

As illustrated in FIG. 1, the service providing system according to the exemplary embodiment of the present invention includes service providing apparatuses 10a and 10b and a vending machine 12. The service providing apparatuses 10a and 10b each serves as a mobile service providing apparatus that autonomously moves within a preset area such as an office to provide a service. The vending machine 12 is installed in, for example, a hot water supply room or a corridor to provide a service. Each of the service providing apparatuses 10a and 10b includes a moving unit that moves its own apparatus within the office and are configured such that each of the service providing apparatuses 10a and 10b freely moves in the office by the moving unit. Further, the vending machine 12 is installed outside the office, and is configured to allow a user to arbitrarily purchase an article such as a refreshment.

Here, in the following, description will be given by using a case where each of the service providing apparatuses 10a and 10b moves to provide the service in a certain office. Thus, each area in the office where each of the service providing apparatuses 10a and 10b moves is the preset area.

In the exemplary embodiment, description will be given on the assumption that the service providing apparatuses 10a and 10b provide a service to provide a refreshment such as coffee in the office, recover containers, packages and the like of the provided refreshment, collect emotional information of a user to whom the service is provided such as a facial expression of the user, and collect environmental information, such as a temperature and humidity, of a place such as a seat of the user to whom the service is provided. Further, in the exemplary embodiment, it is assumed that the vending machine 12 selling the drink is located outside the office.

The service providing apparatuses 10a and 10b and the vending machine 12 are connected to a local network 16 via a wireless LAN terminal 14. Further, terminal apparatuses 17 to 19 such as a personal computer and the control server 20 that controls operations of the service providing apparatuses 10a and 10b are connected to the local network 16. In addition, the control server 20 is configured to receive information from the service providing apparatuses 10a and 10b and the vending machine 12 through the local network 16. Further, the local network 16 is connected to the Internet 23 via a router 22. The information acquired by the control server 20 may be transmitted by accessing a web server 24 through the Internet 23.

Figure 2:
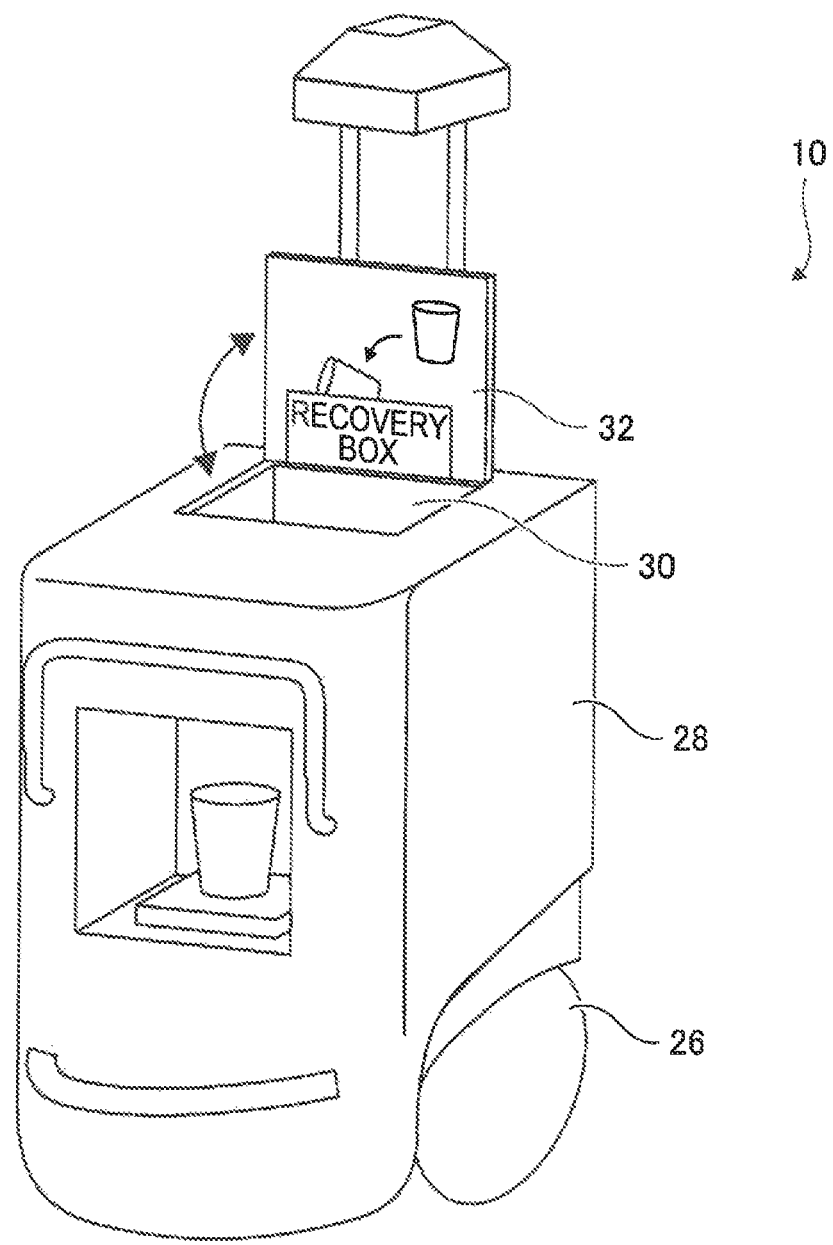
FIG. 2 is a diagram illustrating one example of an external appearance of a service providing apparatus according to an exemplary embodiment of the present invention.

Next, the service providing apparatuses 10a and 10b in the service providing system of the exemplary embodiment are illustrated in FIG. 2. Hereinafter, unless particularly illustrated, since the service providing apparatuses 10a and 10b have the same configuration, the service providing apparatuses 10a and 10b will be described as the service providing apparatus 10.

The service providing apparatus 10 includes a moving unit 26 serving as a moving unit and is configured to freely move in, for example, the office. The service providing apparatus 10 provides a service to provide an article such as a refreshment. A service providing unit 28 used for providing the service of the refreshment is loaded in the moving unit 26. Further, the service providing apparatus 10 is provided with a recovery box 30 serving as a recovery unit that recovers, for example, a container, a package or the like of the refreshment which is a portion of the provided drink or food. The recovery box 30 includes an opening/closing unit 32 that opens and closes an opening of the recovery box 30. That is, when the opening/closing unit 32 is opened to the opening, the user who uses the provided service may accommodate the unnecessary container or package of a drink or food in the recovery box 30.

Figure 3:
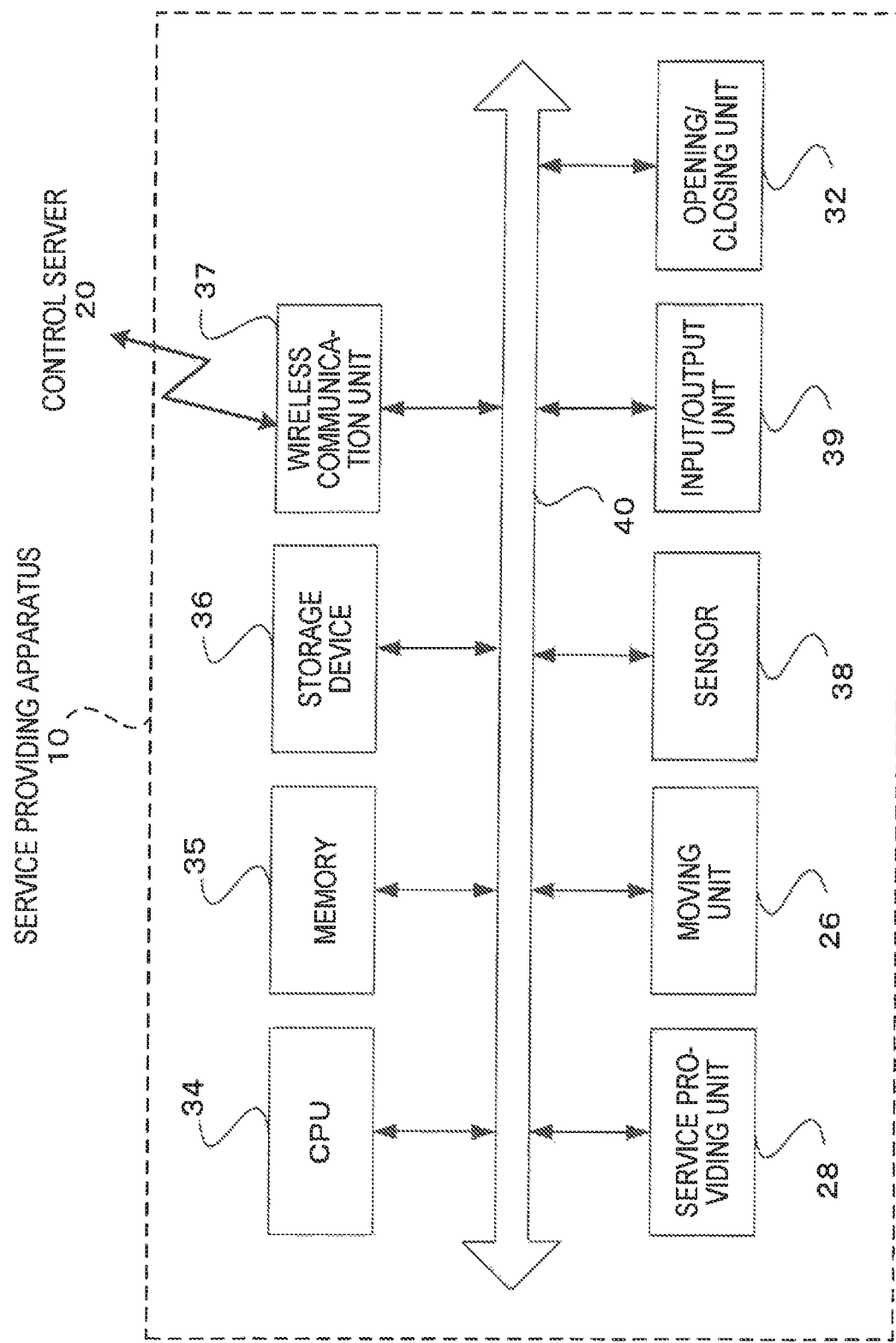
FIG. 3 is a block diagram illustrating the hardware configuration of the service providing apparatus according to the exemplary embodiment of the present invention.

Next, the hardware configuration of the service providing apparatus 10 in the service providing system of the exemplary embodiment is illustrated in FIG. 3.

As illustrated in FIG. 3, the service providing apparatus 10 includes a CPU 34, a memory 35, a storage device 36 such as a hard disk drive (HDD), a wireless communication unit 37 that transmits and receives data to and from a wireless LAN terminal 14 through a wireless line, a service providing unit 28, a moving unit 26, a sensor 38, an input/output unit 39, and an opening/closing unit 32. These components are connected to each other through a control bus 40.

The CPU 34 executes a predetermined process based on a control program stored in the memory 35 or the storage device 36 to control the operation of the service providing apparatus 10. Further, in the exemplary embodiment, the description has been given premised on that the CPU 34 reads and executes the control program stored in the memory 35 or the storage device 36. Alternatively, the program may be stored in a storage medium such as a CD-ROM and provided to the CPU 34.

The sensor 38 detects an ambient condition while moving and detects an obstacle and the like which exist on a cycle route. Further, the sensor 38 acquires information (environmental information) on an environment such as a temperature and humidity in the office. Further, the sensor 38 acquires information (emotional information) on an emotion of a user such as the user's facial expression, voice (volume, tone, and the like), and a body temperature. As the sensor 38, for example, a temperature sensor, a humidity sensor, a light amount sensor, an infrared sensor, an ultrasonic sensor, a camera, and the like may be used.

The input/output unit 39 receives input information for inputting an ID or a password of the user. The input information includes card information such as an ID of an employee ID card or card information of a credit card. The input/output unit 39 includes, for example, an ID input unit to which a user's ID is input with an IC card. Further, the input/output unit 39 includes a camera, a microphone, a speaker, and the like. For example, information regarding the user's face is acquired from the camera as face image information. In addition, information regarding a label of the container of the drink or the remaining amount of the drink in the container is acquired from the camera as image information. Further, the voice data of the user is acquired from the microphone. In addition, the input/output unit 39 includes a data output or input button for a screen display, which serves a user interface, a display for outputting the voice by the speaker or displaying and outputting the status of the service providing apparatus 10, and the like.

Figure 6:
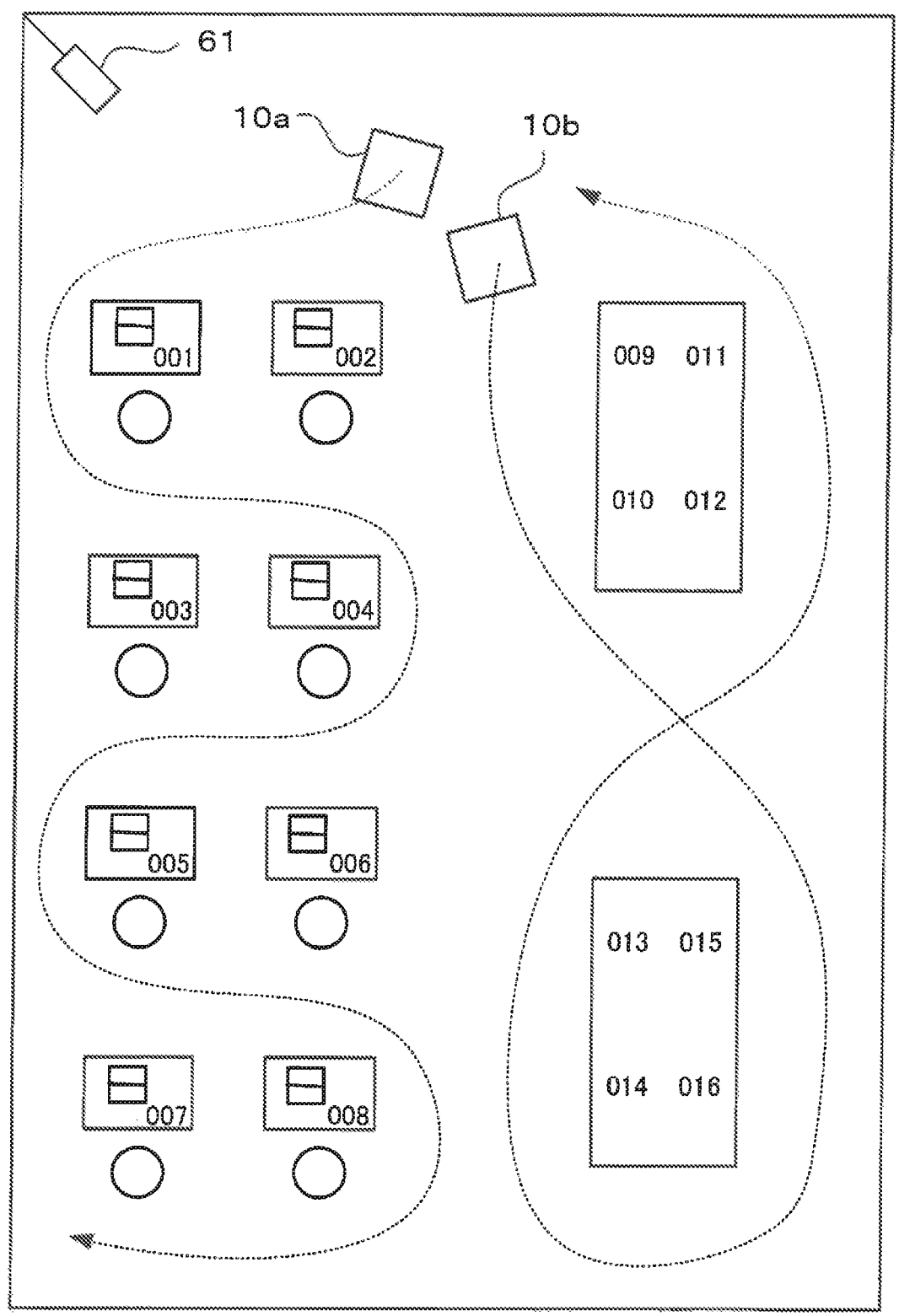
FIG. 6 is a diagram illustrating one example of an office layout in which the service providing apparatus according to the exemplary embodiment of the present inventions.

A map of the office where the terminal apparatuses 1 to 19 and the like are installed is stored in the storage device 36. For example, as illustrated in FIG. 6 (to be described later), map information of an office layout where the service providing apparatus 10a and the service providing apparatus 10b move within the preset area and a monitoring target list (to be described, later) is stored.

The memory 35 or the storage device 36 stores service providing information regarding the user to whom the service providing apparatus 10 provides the service, and the like.

Figure 4:
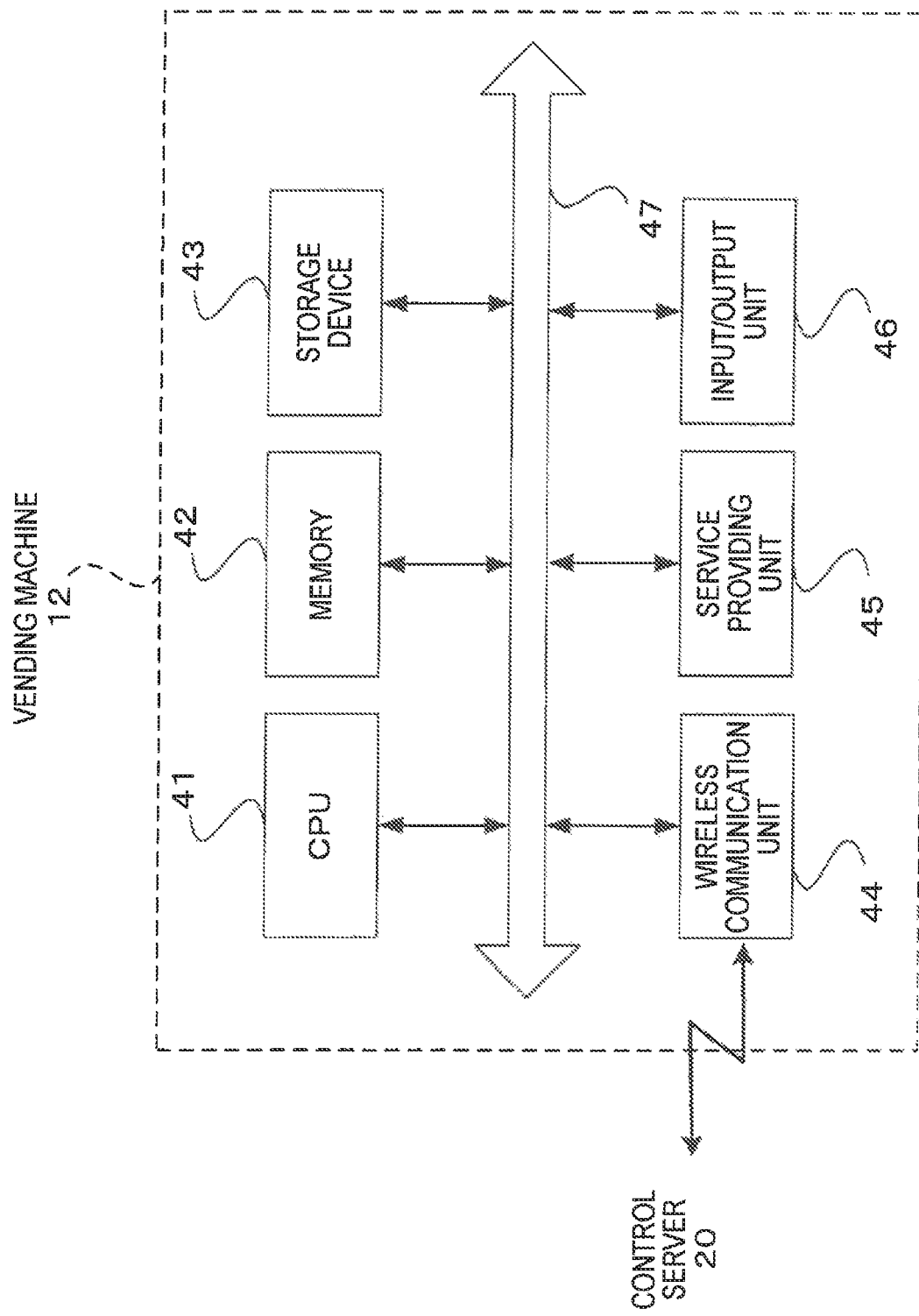
FIG. 4 is a block diagram illustrating the hardware configuration of a vending machine according to the exemplary embodiment of the present invention.

Next, the hardware configuration of the vending machine 12 in the service providing system of the exemplary embodiment is illustrated in FIG. 4.

As illustrated in FIG. 4, the vending machine 12 includes a CPU 41, a memory 42, a storage device 43 such as a hard disk drive (HDD), a wireless communication unit 44 that transmits data to the wireless LAN terminal 14 through the wireless line, a service providing unit 45 that provides the drink, and an input/output unit 46 such as a camera, a microphone, a speaker and the like. These components are connected to each other through a control bus 47.

The CPU 41 executes a predetermined process based on a control program stored in the memory 42 or the storage device 43 to control the operation of the vending machine 12. Further, in the exemplary embodiment, the description has been given premised on that the CPU 41 reads and executes the control program stored in the memory 42 or the storage device 43. Alternatively, the program may be stored in a storage medium such as a CD-ROM and provided to the CPU 41.

The input/output unit 46 receives input information for inputting the ID or password of the user. The input information includes card information such as an ID of an employee ID card or card information of a credit card. The input/output unit 46 includes, for example, the ID input unit to which the user's ID is input with the IC card. Further, the input/output unit 46 includes the camera, the microphone, the speaker, and the like. For example, face age information is acquired from the camera by capturing the face of the user who uses the camera. Further, the voice data of the user is acquired from the microphone. In addition, the input/output unit 46 includes a data output or input button for a screen display, which serves as a user interface, a display for outputting the voice by the speaker or displaying and outputting a status of the vending machine 12, and the like.

The memory 42 or the storage device 43 stores service providing information regarding the user to whom the vending machine 12 provides the drink, and the like.

Herein, the service providing information is information indicating a date when the service providing apparatus 10 or the vending machine 12 provides the service, a providing time, the user input information, a provided article, a providing place, and the like.

The monitoring target list is created based on the service providing information. The monitoring target list includes information required for the service providing apparatus 10 to provide a recovery service of after providing the service, which includes the date when the service providing apparatus 10 or the vending machine 12 provides the service, the providing time, the user ID, the face image information, the provided article, a recovery place, and the like.

Figure 5:
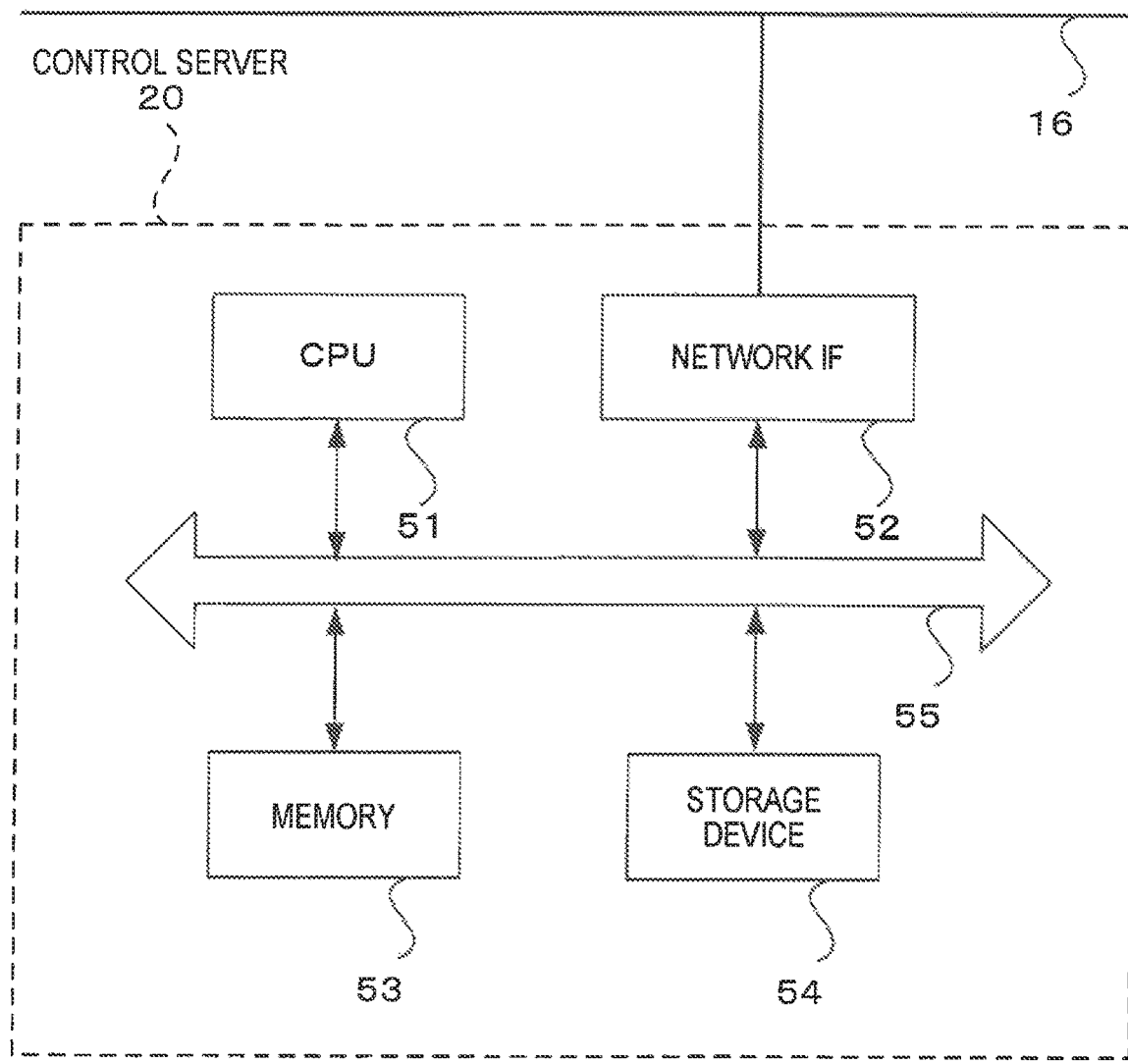
FIG. 5 is a block diagram illustrating the hardware configuration of a control server according to the exemplary embodiment of the present invention.

Next, the hardware configuration of the control server 20 in the service providing system of the exemplary embodiment is illustrated in FIG. 5.

As illustrated in FIG. 5, the control server 20 includes a CPU 51, a network IF 52, a memory 53, and a storage device 54 which are connected to each other via a control bus 55.

The CPU 51 executes a predetermined process based on a control program stored in the memory 53 or the storage device 54 to control the operation of the control server 20. The memory 53 stores the control program.

The memory 53 includes a volatile memory and a nonvolatile memory, and the program stored in the nonvolatile memory (Flash-ROM). The volatile memory (Dynamic-RAM) is used as a work memory. The storage device, such as the HDD, may be used, but a D-RAM is normally used due to a long access time.

The storage device 54 stores a higher-level control program and stores personal information of the user, schedule information of the user, the monitoring target list which is created based on the service providing information received from the service providing apparatus 10 and the vending machine 12, or the emotional information, and various environmental information acquired by the sensor 38 of the service providing apparatus 10.

For example, as illustrated in FIG. 6, the storage device 54 stores the map information such as the office layout where the service providing apparatuses 10a and 10b move within the preset area. For example, the service providing apparatus 10a cyclically moves in the order of seat information 001, 002, 004, 003, 005, 006, 008, 007, 005, 006, 004, 003, 001, and 002. In addition, the service providing apparatus 10b cyclically moves in the order of seat information 009, 010, 015, 016, 014, 013, 012, and 011. Moreover, in the office illustrated in FIG. 6, a security camera 61 is installed on a wall. The interior of the office is captured by the security camera 61.

The control server 20 is connected to the local network 16 via the network IF 52. Thereby, the control server 20 may transmits and receives data to and from the wireless LAN terminal 14 and the terminal apparatuses 17 to 19 and access the web server 24 through the Internet 23.

Figure 7:
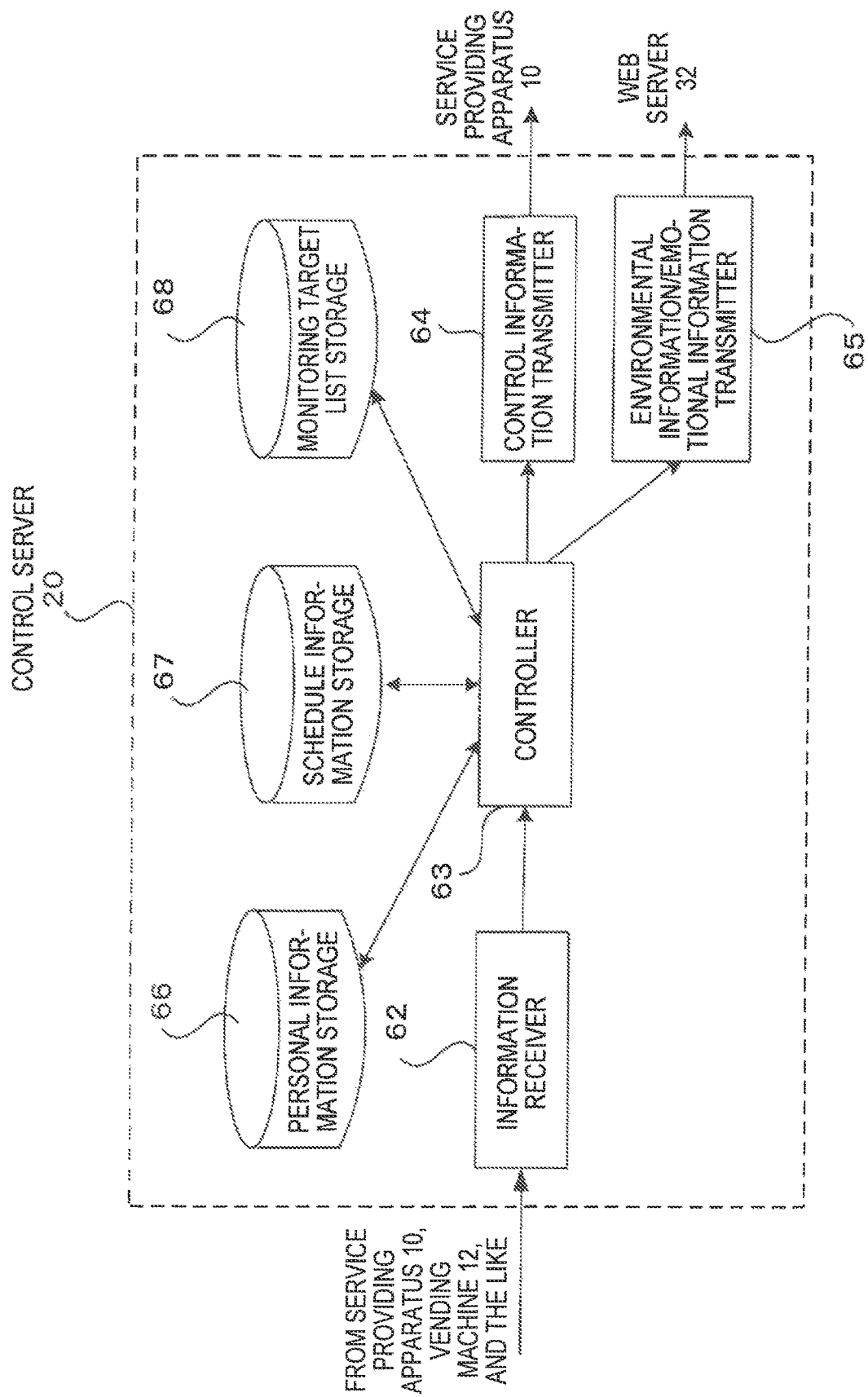
FIG. 7 is a diagram illustrating a functional configuration of the control server according to the exemplary embodiment of the present invention.

FIG. 7 is a block diagram illustrating a functional configuration of the control server 20 implemented by executing the control program.

As illustrated in FIG. 7, the control server 20 of the exemplary embodiment includes an information receiver 62, a controller 63, a control information transmitter 64, an environmental information/emotional information transmitter 65, a personal information storage 66, a schedule information storage 67, and a monitoring target list storage 68.

The information receiver 62 receives various information from the service providing apparatus 10, the vending machine 12, the terminal apparatuses 17 to 19, the web server 24, and the like. Specifically, the information receiver 62 receives the service providing information from the service providing apparatus 10 and the vending machine 12. The service providing information includes, for example, the date when the service providing apparatus 10 or the vending machine 12 provides the service, the providing time, the user input information, the provided article, the providing place, and the like, as illustrated in FIG. 8.

The personal information storage 66 stores the personal information of each user in advance, which includes the user ID, the face image information of the user, the card information such as the credit card information, and seat information of the user, as illustrated, for example, in FIG. 9.

Upon receiving the service providing information from the information receiver 62, the controller 63 specifies the user (user ID) to whom the service is provided based on (i) the user input information, such as the face image information and the card information, which is included in the service providing information and (ii) the personal information stored in the personal information storage 66. In addition, the controller 63 acquires the seat information of the specified user and specifies a place where the user s present.

Then, the controller 63 creates the monitoring target list based on the service providing information and the personal information stored in the personal information storage 66 by using the location (seat information) where the specified user is present as the recovery place. The monitoring target list 70 is created for each service providing apparatus 10 that provides the recovery service. In other words, a monitoring target list 70a in which the periphery of the cycle route (seat information 001 to 008) of the service providing apparatus 10a is the recovery place and a monitoring target list 70b in which the periphery of the cycle route (seat information 009 to 016) of the service providing apparatus 10b is the recovery place are created. Further, upon receiving the service providing information from the service providing apparatus 10 or the vending machine 12, the controller 63 updates each of the monitoring target lists 70a and 70b as needed.

The monitoring target list storage 68 stores the monitoring target lists 70a and 70b. FIG. 10A is a diagram illustrating one example of the monitoring target list 70a transmitted to the service providing apparatus 10a. FIG. 10B is a is am illustrating one example of the monitoring target list 70b transmitted to the service providing apparatus 10b.

Each of the monitoring target lists 70a and 70b includes the date when the service is provided, the providing time, the user ID, the face image information, the provided article, the recovery place, and the like. Upon receiving information such as the service providing information from the service providing apparatus 10 or the vending machine 12, the monitoring target lists 70a and 70b are updated as needed.

Under on the control of the controller 63, the control information transmitter 64 transmits control information for controlling the service providing apparatus 10a or 10b to the service providing apparatus 10a or 10b via the wireless LAN terminal 14. Specifically, under the control of the controller 63, the control information transmitter 64 transmits the monitoring target list 70a or 70b for controlling the service providing apparatus 10a or 10b to the service providing apparatuses 10a or 10b via the wireless LAN terminal 14.

Under the control of the controller 63, the environmental information/emotional information transmitter 65 transmits (i) various kinds of sensor information, such as the environmental information and the emotional information, received from the service providing apparatus 10 and (ii) at least a part of the service providing information when the sensor information is acquired to the web server 24 and feeds back the information to a provider such as a maker.

Next, FIG. 11 illustrates one example of the schedule information stored in the schedule information storage 67.

The schedule information storage 67 stores the schedule information which is information on a schedule of each user and which is received from the terminal apparatuses 17 to 19. For example, the schedule information storage 67 stores the schedule information such as date, time, contents, and a place, for each user.

That is, upon receiving the service providing information from the service providing apparatus 10 or the vending machine 12 through the information receiver 62, the controller 63 specifies the user (user ID) to whom the service is provided based on the user input information of the service providing information and the personal information, such as the face image information or the card information, stored in the personal information storage 66.

The controller 63 may specify the place where the user is present based on the schedule information of the specified user. For example, based on the schedule information, the controller 63 may not provide the recovery service during a time period when the user to whom the service is provided is out of the office due to a meeting, a business trip, or the like.

The controller 63 may specify the place where the user is present based on the face image information captured by the security camera 61, positional information of a portable terminal carried by the user, or the like.

That is, even in the case where the service providing place is different from the seat of the user, such as the case where the drink is provided by the vending machine 12, or in the case where the user is out of the seat due to the meeting, the controller 63 may specify the user to whom the service is provided and specify the place where the user is present based on the seat information stored in the personal information storage 66, the schedule information stored in the schedule information storage 67, the face image information of the security camera 61, the positional information of the portable terminal carried by the user, or the like.

Figure 12:
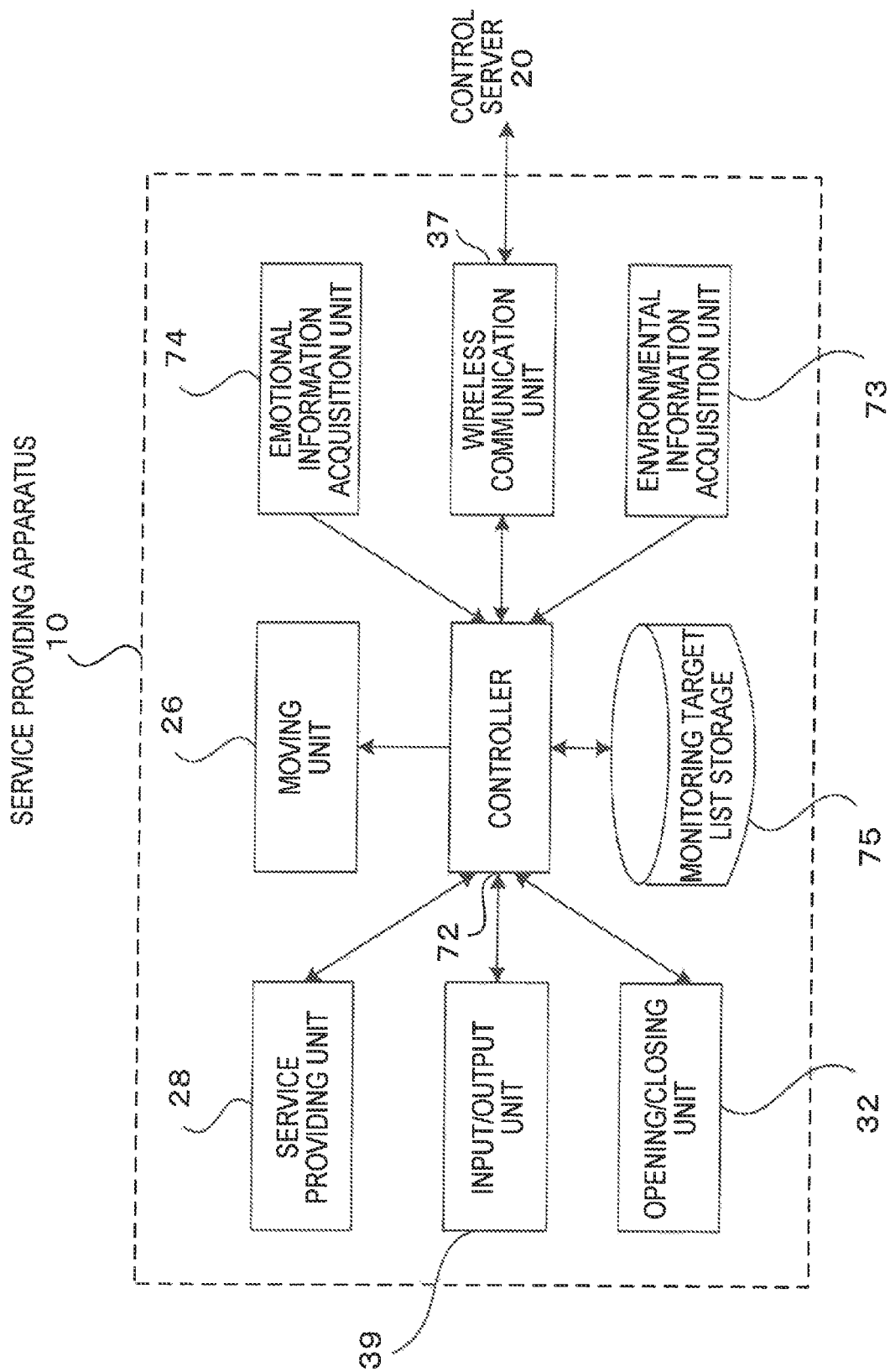
FIG. 12 is a diagram illustrating the functional configuration of the service providing apparatus according to the exemplary embodiment of the present invention.

FIG. 12 is a block diagram illustrating the functional configuration of the service providing apparatus 10, which is implemented by executing the control program.

The service providing apparatus 10 of the exemplary embodiment includes the wireless communication unit 37, the service providing unit 28, the moving unit 26, the input/output unit 39, the opening/closing unit 32, a controller 72, an environmental information acquisition unit 73, an emotional information acquisition unit 74, and a monitoring target list storage 75, as illustrated in FIG. 12.

The monitoring target list 70a is stored in the monitoring target list storage 75a of the service providing apparatus 10a, and the monitoring target list 70b is stored in the monitoring target list storage 75b of the service providing apparatus 10b.

The service providing apparatuses 10a and 10b are configured as follows. That is, even when the service providing apparatuses 10a and 10b cannot visually recognize the user after providing the refreshment, the service providing apparatuses 10a and 10b specify the user to whom the refreshment is provided in each cycle route based on the monitoring target lists 70a and 70b. For example, if a preset time elapses from the time when the refreshment is provided to the user, the service providing apparatuses 10a and 10b provide the recovery service to recover the container or package of the provided refreshment from the user by moving, by the moving unit 26, to the place where the specified user is present.

Herein, examples of the case where the user cannot be visually recognized include a case where the user cannot be visually recognized (detected) from the cameras of the service providing apparatuses 10a and 10b and a case where the vending machine 12 cannot be visually recognized from the user.

The environmental information acquisition unit 73 acquires information (environmental information) on an environment such as the temperature and humidity in the office by the sensor 38 when the service or the recovery service is provided.

The emotional information acquisition unit 74 acquires information (emotional information) on the emotion such as the facial expression and voice (volume, tone, or the like), and the body temperature of the user to whom the service is provided through the sensor 38 when the recovery service is provided.

The controller 72 transmits (i) the various kinds of sensor information such as the environmental information acquired by the environmental information acquisition unit 73 and the emotional information acquired by the emotional information acquisition unit 74 and (ii) the at least part of the service providing information when the sensor information is acquired to the control server 20 through the wireless communication unit 37.

Figure 13:
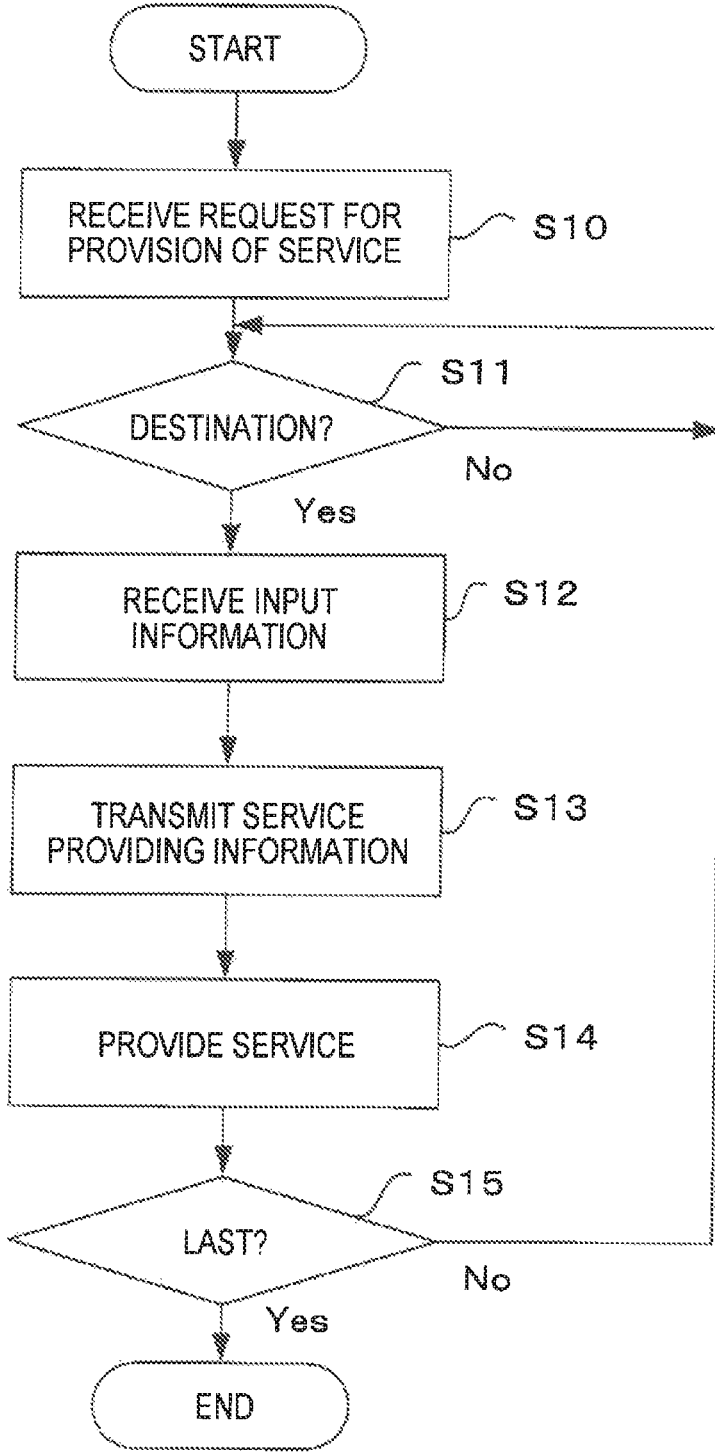
FIG. 13 is a flowchart illustrating a service providing operation of the service providing apparatus according to the exemplary embodiment of the present invention.

FIG. 13 is a flowchart illustrating a service providing operation of the service providing apparatus 10.

First, when information on the user and the provision of the services is output from the terminal apparatuses 17 to 19 of the user to the control server 20, a movement command is issued from the control server 20 to the service providing apparatus 10. In this case, the movement command is issued to the service providing apparatus 10a or 10b whose cycle route includes a place where the movement command is issued. Hereinafter, a case where the movement command is issued to the service providing apparatus 10a will be described as an example.

When the service providing apparatus 10a receives request for provision of the service from the control server 20 during a routine traveling and receives the movement command (step S10), the controller 72 controls the service providing apparatus 10a to move to, for example, a location where providing of coffee is instructed based on the seat information acquired from the control server 20.

The controller 72 determines whether the service providing apparatus 10a reaches a destination (step S11). If it is determined by the controller 72 that the service providing apparatus 10a reaches the destination ("Yes" in step S11), the controller 72 controls the moving unit 26 to stop the service providing apparatus 10a.

When the user input information is received by the input/output unit 39 (step S12), the controller 72 transmits the service providing information to the control server 20 through the wireless communication unit 37 (step S13).

Specifically, for example, when the user brings the ID card, the credit card, or the like into contact with the input/output unit 39 of the service providing apparatus 10a, the controller 72 transmits the service providing information indicating the input information such as the card information, the date when the service is provided, the providing time, the provided article, the providing place, and the like which are acquired by the input/output unit 39 to the control server 20.

The controller 72 controls to start providing the designated refreshment by the service providing unit 28 (step S14). For example, the controller 72 controls the coffee to be provided.

Then, the controller 72 determines whether the reception of the service provision is the last (step S15). If it is determined that the reception of the service provision is not the last ("No" in step S15), the process returns to the process of step S11 to set a current location as a departure point, and the controller 72 controls the service providing apparatus 10a to move to the location (destination point) where a next service is to be provided.

If it is determined by the controller 72 that the service provision is the last ("Yes" in step S15), the controller 72 controls the service providing apparatus 10a to move to a predetermined position such as a home position and ends the process.

Figure 14:
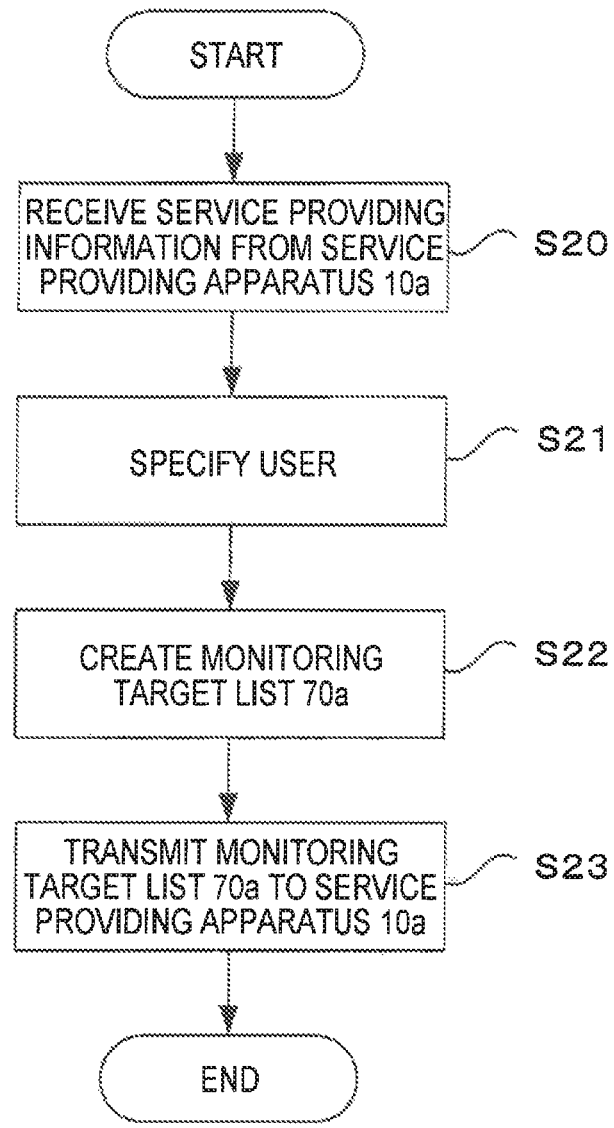
FIG. 14 is a flowchart illustrating an operation of a control server in a case where the service providing information is received from the service providing apparatus.

FIG. 14 is a flowchart illustrating the operation of the control server 20 in a case where the service providing information is received from the service providing apparatus 10a.

Upon receiving the service providing information from the service providing apparatus (step S20), the controller 63 specifies the user who uses the service providing apparatus 10a based on the card information acquired as the input information and the card information stored in the personal information storage 66 (step S21). At this time, the controller 63 specifies the place which is indicated by the service providing information as the providing place and at which the service providing apparatus 10a provides the service, as the recovery place.

The controller 63 creates the monitoring target list 70a based on the service providing information (step S22).

The controller 63 transmits the monitoring target list 70a to the service providing apparatus 10a (step S23).

Figure 15:
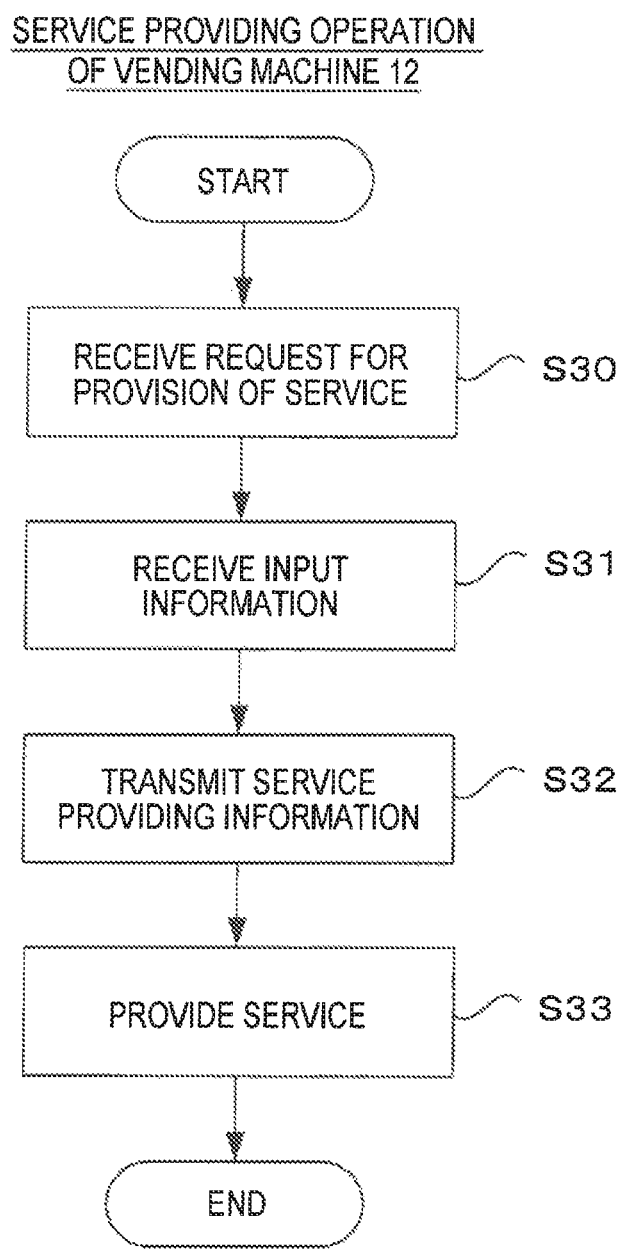
FIG. 15 is a flowchart illustrating the service providing operation of the vending machine according to the exemplary embodiment of the present invention.

FIG. 15 is a flowchart illustrating a service providing operation of the vending machine 12.

First, when the vending machine 12 receives a request for provision of the drink (step S30), the CPU 41 receives the user input information by the input/output unit 46 (step S31). The CPU 41 transmits the service providing information to the control server 20 via the wireless communication unit 44 (step S32).

Specifically, for example, when the user performs a purchase operation in front of the vending machine 12, the CPU 41 acquires the face image of the user with the camera built in the vending machine 12. The CPU 41 transmits to the control server 20 the service providing information indicating the acquired face image information (input information), the providing date, the providing time, the provided article, the providing place, and the like.

The CPU 41 controls to start providing the drink by the service providing unit 45 (step S33). For example, the controller 72 controls the coffee to be provided.

Figure 16:
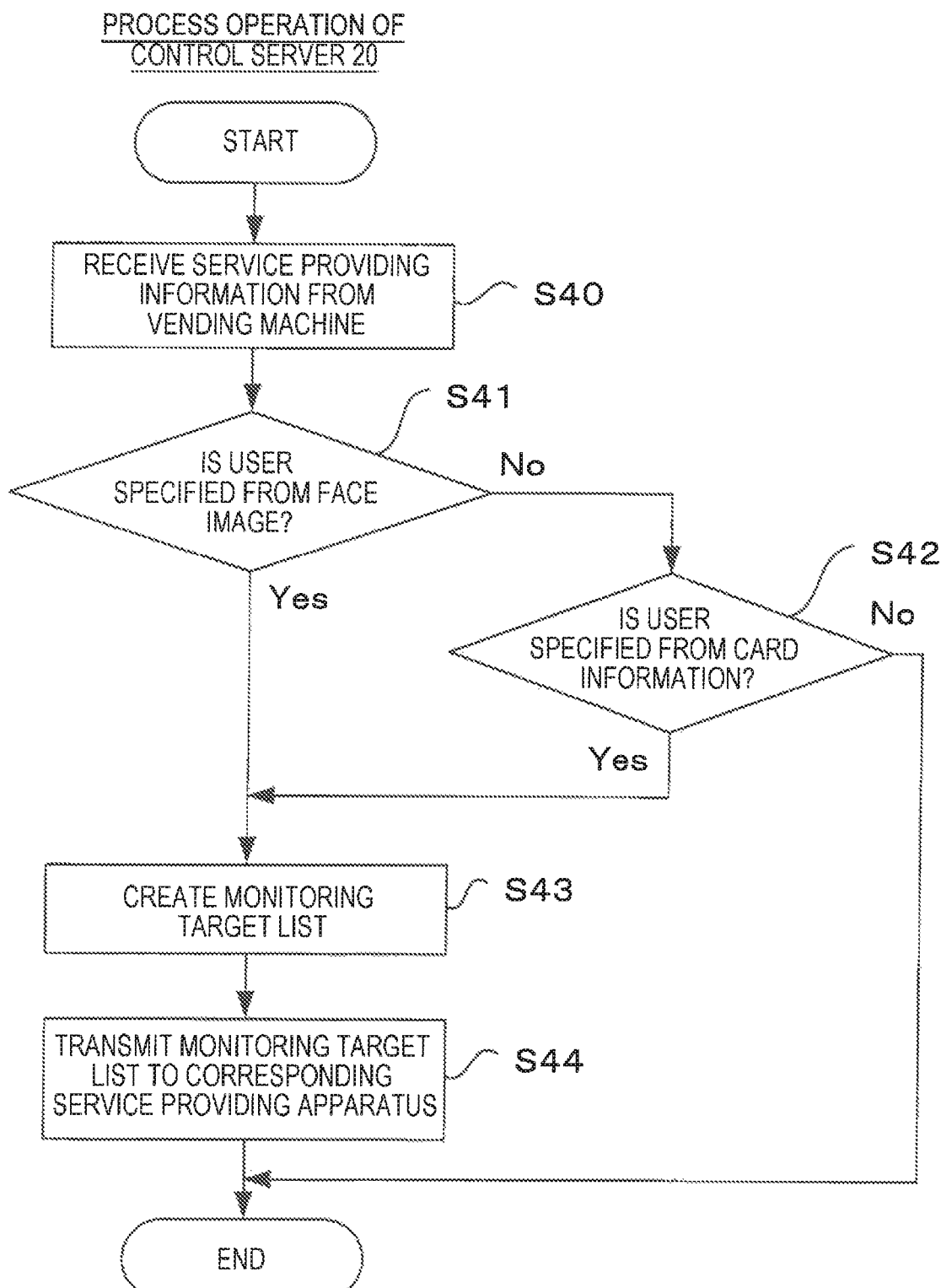
FIG. 16 is a flowchart illustrating the operation of the control server in a case of receiving the service providing information from the vending machine.

FIG. 16 is a flowchart illustrating the operation of the control server 20 in a case of receiving the service providing information from the vending machine 12.

Upon receiving the service providing information from the vending machine 12 (step S40), the controller 63 determines whether the user who uses the vending machine 12 can be specified based on the face image information acquired as the input information and the face image information stored in the personal information storage 66 (step S41). If it is determined that the user cannot be specified from the face image information ("No" in step S41), the controller 63 determines whether the user who uses the vending machine 12 can be specified based on the card information acquired as the input information and the card information stored in the personal information storage 66 (step S42). If it determined that the user cannot be specified based on the card information ("No" in step S42), the process ends.

If it is determined that the user who uses the vending machine 12 can be specified based on the face image information or the card information ("Yes" in step S41 and "Yes" in step S42), the seat information of the specified user is specified as the recovery place.

The controller 63 creates the monitoring target list 70a or 70b based on the service providing information (step S43).

The controller 63 transmits the corresponding monitoring target list 70a or 70b to the service providing apparatus 10a or 10b whose cycle route includes the specified recovery place (step S44).

Figure 17:
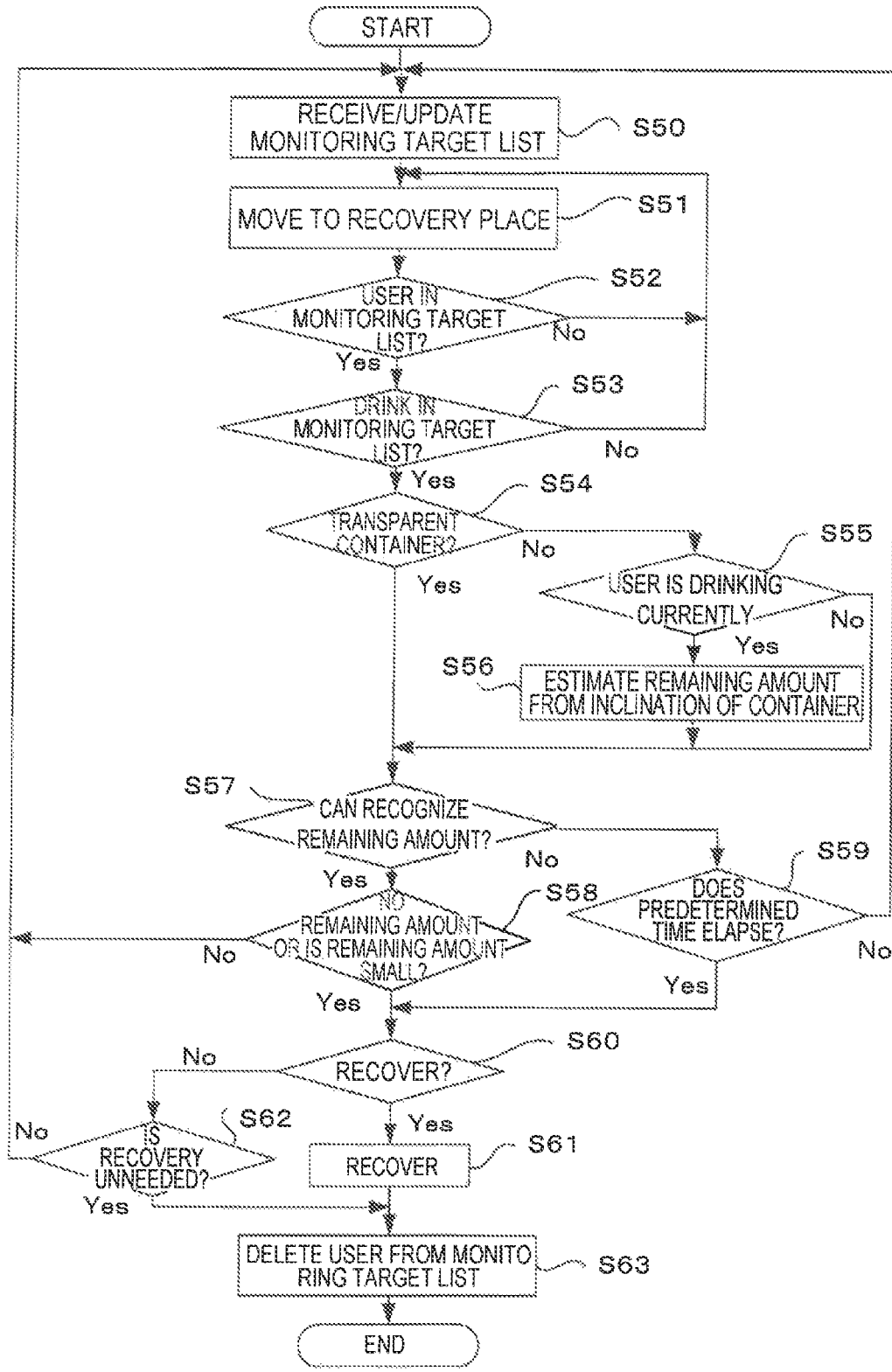
FIG. 17 is a flowchart illustrating the operation of the service providing apparatus in a case of receiving the monitoring target list from the control server.

FIG. 17 is a flowchart illustrating the recovery service of the service providing apparatus 10a.

Upon receiving the monitoring target list 70a from the control server 20 (step S50), the controller 72 moves to the recovery place of the user in the monitoring target list 70a during the traveling (step S51).

The controller 72 acquires the face image information with, for example, the camera of the input/output unit 39 to determine whether the acquired face image information corresponds to the user in the monitoring target list 70a (step S52).

If it is determined that the acquired face image information corresponds to the user in the monitoring target list 70a ("Yes" in step S52), the controller 72 acquires the image information and determines whether the acquired image information corresponds to the drink of the user in the monitoring target list 70a (step S53). If it is determined that the acquired face image information does not correspond to a user in the monitoring target list 70a ("No" in step S52), the process returns to the process of step S51.

If it is determined that the acquired image information corresponds to the drink of the user in the monitoring target list 70a ("Yes" in step S53), the controller 72 determines whether the container of the drink is transparent based on the image information (step S54). If it is determined that the acquired image information does not correspond to the drink in the monitoring target list 70a ("No" in step S53), the process returns to the process of step S51.

If it is determined that the container of the drink is not transparent ("No" in step S54), the controller 72 determines whether the user in the monitoring target list 70a is currently drinking the drink in the monitoring target list 70a based on image information (step S55).

If it is determined that the user in the monitoring target list 70a is currently drinking the drink ("Yes" in step S55), the controller 72 detects an inclination of the container with respect to a horizontal direction and estimates the remaining amount of the drink in the container based on the image information (step S56). Further, if it is determined that the user is not drinking the drink ("No" in step S55), the process proceeds to the process of next step S57.

Figure 18:
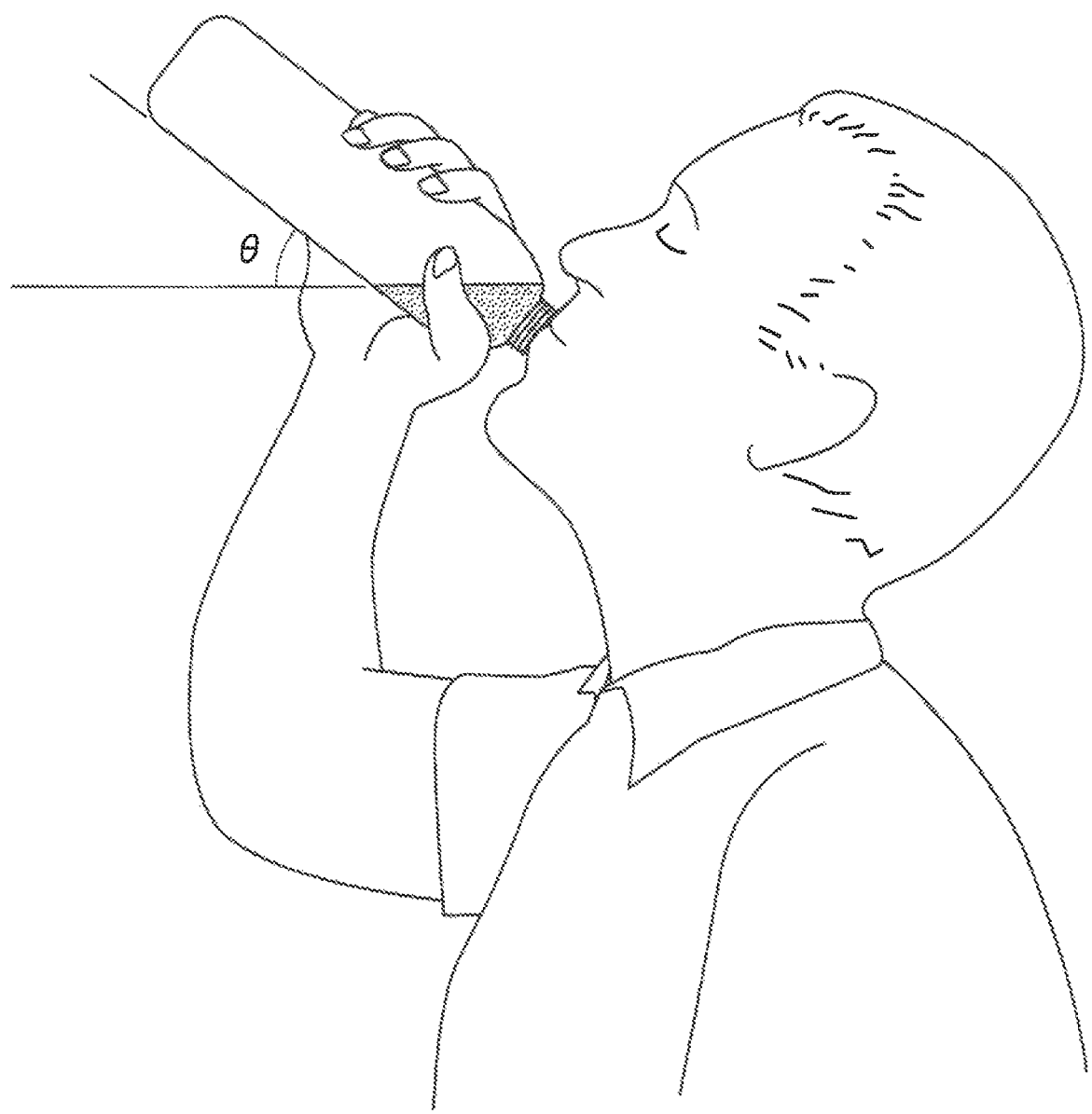
FIG. 18 is a diagram illustrating one example of an operation, of the service providing apparatus according to the exemplary embodiment of the present invention, of estimating a remaining amount of a drink in a container.

FIG. 18 is a diagram illustrating estimating the remaining amount of the drink in the container from the inclination of the container.

The controller 72 acquires the image information with, for example, the camera to detect the inclination of the container.

Herein, when the remaining amount of the drink in the container is small, an angle θ of the container with respect to the horizontal direction is larger than a case where the remaining amount of the drink in the container is large, as illustrated in FIG. 18.

That is, when the user in the monitoring target list 70a is drinking the drink at the time of detection, the controller 72 acquires the image information, detects the angle θ of the container with respect to the horizontal direction based on the acquired image information. If the angle θ is larger than a preset angle, the controller 72 estimates that the remaining amount of the drink in the container is small.

If it is determined that the container of the drink is transparent ("Yes" in step S54), if it is determined that the user is not drinking the drink ("No" in step S55), or if the remaining amount of the drink is estimated from the incli- nation of the container (step S56), the controller 72 deter- mines whether the remaining amount in the container of the drink can be recognized based on the image information (step S57).

If it is determined that the remaining amount of the drink in the container can be recognized ("Yes" in step S57), the controller 72 determines whether there is no remaining amount or the remaining amount in the container is small based on the image information (step S58). If it is deter- mined that the remaining amount in the container cannot be recognized ("No" in step S57), the controller 72 determines whether preset time elapses from the time when the drink is provided (step S59).

If it is determined that there is no remaining amount or the remaining amount in the container is small ("Yes" in step S58), if the preset time elapses from the time when the drink is provided ("Yes" in step S59) or if the preset time elapses from the previous inquiry ("Yes" in step S59), the controller 72 inquires of the user about whether to recover the con- tainer by the voice or through a UI screen and determines whether to recover the container (step S60).

Figure 19:
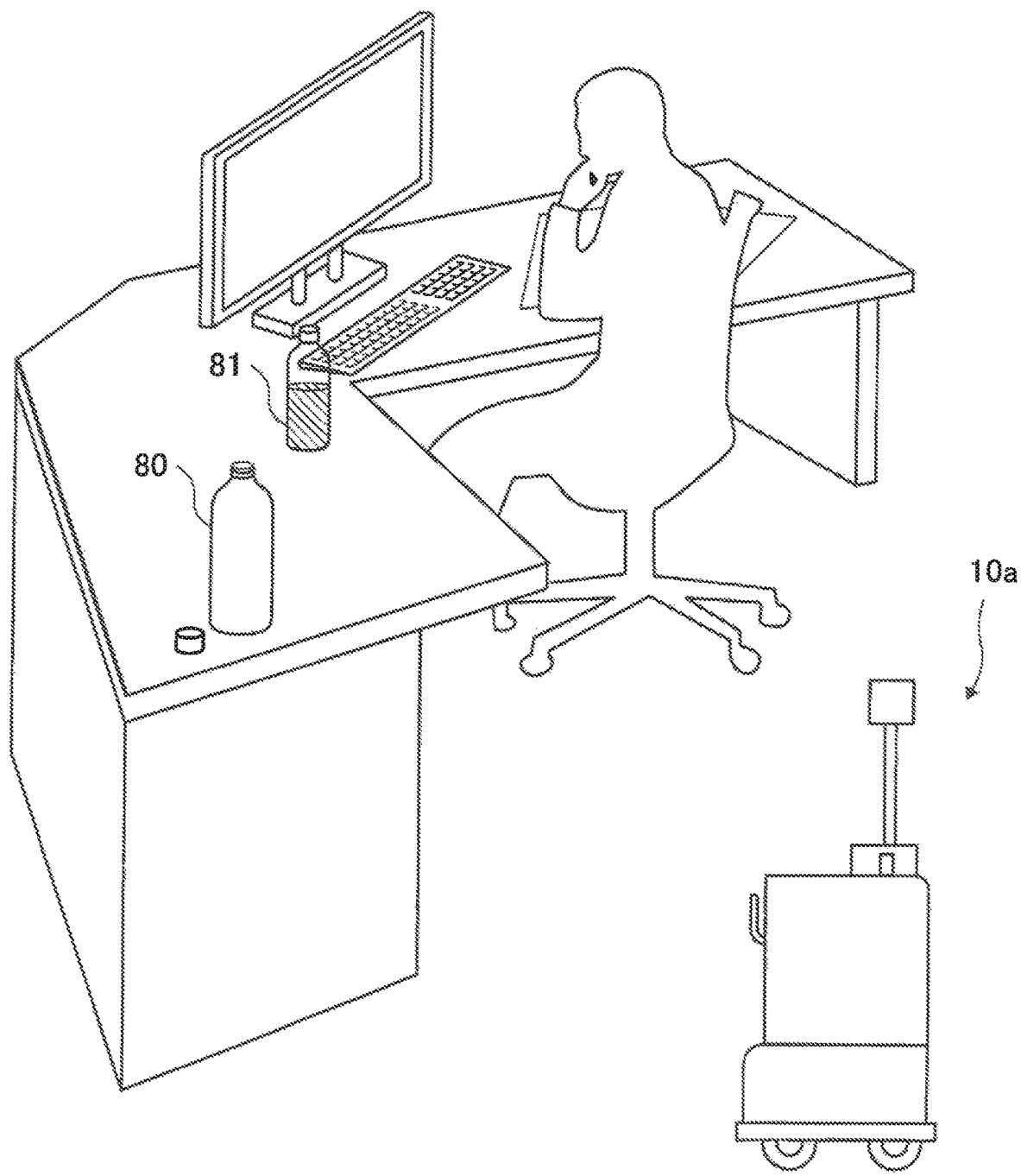
FIG. 19 is a diagram illustrating one example of an operation, of the service providing apparatus according to the exemplary embodiment of the present invention, of detecting the remaining amount of the drink in the container.

FIG. 19 is a diagram for describing an operation of detecting the remaining amount of the drink in the container.

The service providing apparatus 10 acquires the image information with, for example, the camera to detect the remaining amount of the drink in the container.

That is, the service providing apparatus 10 detects the remaining amount of the drink in the container. If the inside of the container is empty as illustrated in a drink 80 in FIG. 19 or if the remaining amount in the container is equal to or less than a preset value, the service providing apparatus 10 determines that there is no remaining amount in the con- tainer or that the remaining amount is small and then, inquires of the user about whether to recover the container. In addition, if the remaining amount in the container is more than the preset value as illustrated in a drink 81 in FIG. 19, the service providing apparatus 10 does not provide the recovery service and the process returns to the cycle opera- tion.

If it is determined that the container is to be recovered ("Yes" in step S60), the controller 72 opens the opening/ closing unit 32 so that the container is recovered in the recovery box 30. In this case, the controller 72 acquires, by the sensor 38, the environmental information such as the temperature and humidity of the place where the user is present or the emotion information such as the facial expres- sion and the body temperature of the user, and transmits the acquired information together with the service providing information to the control server 20.

If it is determined that the container is not to be recovered ("No" in step S60), the controller 72 inquires of the user whether providing the recovery service is unneeded again and it is determined whether providing the recovery service again is unneeded (step S62).

If the container is recovered in the recovery box 30 (step S61) or if it is determined that providing the recovery service again is unneeded ("Yes" in step S62), the controller 72 deletes the user from the monitoring target list 70a (step S63) and does not provide the recovery service. Further, if it is determined that providing the recovery service again is needed ("No" in step S62), the process returns to the process of step S50 and the controller updates the monitoring target list 70a.

Next, another operation of the service providing apparatus 10 will be described.

FIG. 20 is a flowchart illustrating one example of another operation of the service providing apparatus 10.

Upon receiving a monitoring target list 70 from the control server 20 (step S70), the controller 72 moves to a place (recovery place) where a user in the monitoring target list 70 is present during traveling (step S71).

The controller 72 acquires the face image information with, for example, the camera of the input/output unit 39 to determine whether the acquired image information corre- sponds to the user in the monitoring target list 70 (step S72).

If it is determined that the acquired image information does not correspond to the user in the monitoring target list 70 ("No" in step S72), the process returns to the process of step S71. If it is determined that the acquired image infor- mation corresponds to the user in the monitoring target list 70 ("Yes" in step S72), the controller 72 determines whether the drink of the user in the monitoring target list 70 is, for example, coffee (step S73).

If it is determined that the drink provided to the user in the monitoring target list 70 is the coffee ("Yes" in step S73), the controller 72 proposes provision of confectionery suitable for the coffee, for example, provision of western confec- tionery (step S74). In addition, if it is determined that the drink provided to the user in the monitoring target list 70 is not the coffee ("No" in step S73), the controller 72 proposes provision of confectionery suitable for a drink other than the coffee, for example, provision of Japanese confectionery (step S75). That is, the controller 72 may propose providing confectionery according to a type of a drink provided to the user.

The controller 72 determines whether the confectionery is provided to the user (step S76). If it is determined that the confectionery is provided ("Yes" in step S76), the controller 72 transmits the service providing information on the user to whom the confectionery is provided to the control server 20 (step S77) and ends the process. If it is determined that the confectionery is not provided ("No" in step S76), the process ends.

In the exemplary embodiment, the example in which the card information is used as the user input information of the user who uses the service providing apparatus 10 has been described, but the exemplary embodiments of the present invention are not limited thereto. As the user input infor- mation using the service providing apparatus 10, the face image information or the like may be used.

In the exemplary embodiment, the description has been made on the example in which the face image information is used as the user input information of the user who uses the vending machine 12, but the exemplary embodiments of the present invention are not limited thereto. As the user input information of the user who uses the vending machine 12, the card information or identification information of the portable terminal carried by the user may be used. The user input information may be input into the vending machine 12 from the portable terminal carried by the user who uses the vending machine 12, by wireless communication.

In the exemplary embodiment, the description has been made on the example in which in the service providing operations of the service providing apparatus 10 and the vending machine 12, the provision of the service is started after transmitting the service providing information the control server 20, but the exemplary embodiments of the present invention are not limited thereto. For example, the service providing information may be transmitted to the control server 20 during the provision of the service or after the provision of the service.

In the exemplary embodiment, the description has been given on the configuration for recovering a portion of the provided article after providing the article such as a refreshment. In the case of providing an article that needs not be recovered, such as an article without the container or package, the recovery service may not be provided. That is, the recovery service to recover a portion of the provided article in accordance with the provided article may be provided.

In the exemplary embodiment, the description has been made on the example of inquiring of the user whether to recover the container if a preset time elapses from the time when the drink is provided or from the previous inquiry, but the exemplary embodiments of the present invention are not limited thereto. For example, an average time up to the time when the remaining amount in the container becomes empty from the time of providing each type of a drink to the user may be recorded, this time may be added to the monitoring target list 70, and the recovery service may be provided according to the recorded average time.

In the exemplary embodiment, the description has been made on the example when the recovery place is specified based on the specified seat information of the user and the recovery service is provided, but the exemplary embodiments of the present invention are not limited thereto. For example, the place where the user is present may be specified based on the face image information acquired by the camera of the service providing apparatus 10, the face image information captured by the security camera 61, and the schedule information stored the schedule information storage 67, and the recovery service may be provided.

The place where the user is present may be specified based on the positional information of the portable terminal carried by the user. For example, when the vending machine 12 provides the article to the user, the current position of the user is specified using the identification information of the portable terminal provided to the vending machine 12 or a predetermined settlement system as the user input information. The controller 63 may perform this specifying by using the existing position acquisition technology such as Wi-Fi (registered trademark). For example, when acquiring the identification information of the portable terminal acquired by the Wi-Fi device in the environment where the Wi-Fi device and the positional information of the Wi-Fi device are managed in association with each other, the positional information of the Wi-Fi device is used as the position information of the portable terminal. As a result, the controller 63 specifies the place where the user is present.

In the exemplary embodiment, the description has been made on the example in which the place where the user is present is specified and the recovery service to recover some of the provided article is provided, but the exemplary embodiments of the present invention are not limited thereto. The recovery may not be performed.

In the service providing system of the exemplary embodiment, the configuration using the service providing apparatus 10, the vending machine 12, and the control server 20 has been described, but the exemplary embodiments of the present invention are not limited thereto. For example, the process open n described for the control server 20 may be performed by the service providing apparatus 10.

Modified Example

In the exemplary embodiment, the service to provide the refreshment has been described, but the exemplary embodiments of the present invention are not limited thereto. For example, the present invention is similarly applicable even to a print service, providing stationery or medicine in the office, providing parts or tools at a factory, and the like.

The foregoing description of the exemplary embodiments of the present invention has been provided for the purposes of illustration and description. It is not intended, to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A mobile service providing system comprising:
at least one controller configured to:
move a mobile service providing apparatus of the mobile service providing system;
provide an article to a particular user, and specify the particular user to whom the article is provided;
wait a preset time from when the article is provided to the particular user; and
after the preset time expires, determine whether a portion of the provided article should be recovered, and, in a case that the controller determines the portion of the provided article should be recovered, recover the portion of the provided article from the user by moving to a place where the specified particular user present,
wherein the controller further considers a stored schedule information of the user, and determines not to recover the portion of the provided article when the user is determined by the controller to be out of the office based upon the stored schedule information.

2. The mobile service providing system according to claim 1, wherein the place where the specified particular user is present is a place where the article is provided to the user.

3. The mobile service providing system according to claim 1, wherein the place where the specified particular is present is a place different from a place where the article is provided to the user.

4. The mobile service providing system according to claim 3, wherein the controller specifies the user based on a face image acquired when the article is provided to the user.

5. The mobile service providing system according to claim 3, wherein the controller specifies the user based on card information acquired when the article is provided to the user.

6. The mobile service providing system according to claim 3, wherein the controller recovers the portion of the provided article from the user by moving to the place where the specified particular user is present, based on a face image captured by a security camera installed in each place.

7. The mobile service providing system according to claim 3, wherein the recovery unit recovers the portion of the provided article from the user by moving to the place where the user is present, based on information on a seat of the specified particular user.

8. The mobile service providing system according to claim 1, wherein controller recovers the portion of the provided article from the user in accordance with the article provided to the user.

9. The mobile service providing system according to claim 1, wherein the controller does not recover the portion of the provided article from the user if the recovery is rejected by moving to the place where the specified particular user is present.

10. The mobile service providing system according to claim 1, wherein
the article provided to the user is refreshment, and
the controller recovers a container or package of the refreshment.

11. The mobile service providing system according to claim 1, wherein
the article provided to the user is a drink, and the controller further estimates a remaining amount of the drink provided to the user specified by the specifying unit, wherein
the controller recovers the container of the drink from the user if the remaining amount of the drink estimated by the estimating unit is equal to or less than a preset value.

12. The mobile service providing system according to claim 11, wherein the controller further proposes providing of confectionery to the user in accordance with a type of the drink provided to the user.

13. The mobile service providing system according to claim 1, wherein the controller acquires, by moving the mobile service providing apparatus, information on an environment of the place where the specified particular user is present.

14. The mobile service providing system according to claim 1, wherein the controller further acquires, by moving the mobile service providing apparatus, information on an emotion of the specified particular user.

15. A non-transitory computer readable storage medium storing a program that causes a processor of a mobile service providing apparatus to execute a mobile service providing process, the process comprising:
providing an article to a particular user, and specifying the particular user to whom the article is provided;
waiting a preset time from when the article is provided to the particular user; and
after the preset time expires, determine whether a portion of the provided article should be recovered, and, in a case that it is determined that the portion of the provided article should be recovered, recover the portion of the provided article from the user by moving to a place where the specified particular user present,
wherein the process further includes considering a stored schedule information of the user, and the determining determines not to recover the portion of the provided article when the user is determined to be out of the office based upon the stored schedule information.

16. The non-transitory computer readable storage medium according to claim 15, wherein the process further includes, once the preset time expires, moving the mobile service providing apparatus to the place where the user specified by the specifying unit is present, to acquire information on an environment of a place where the specified particular user is present or information on an emotion of the specified particular user.

* * * * *